United States Patent Office 3,529,131
Patented Sept. 15, 1970

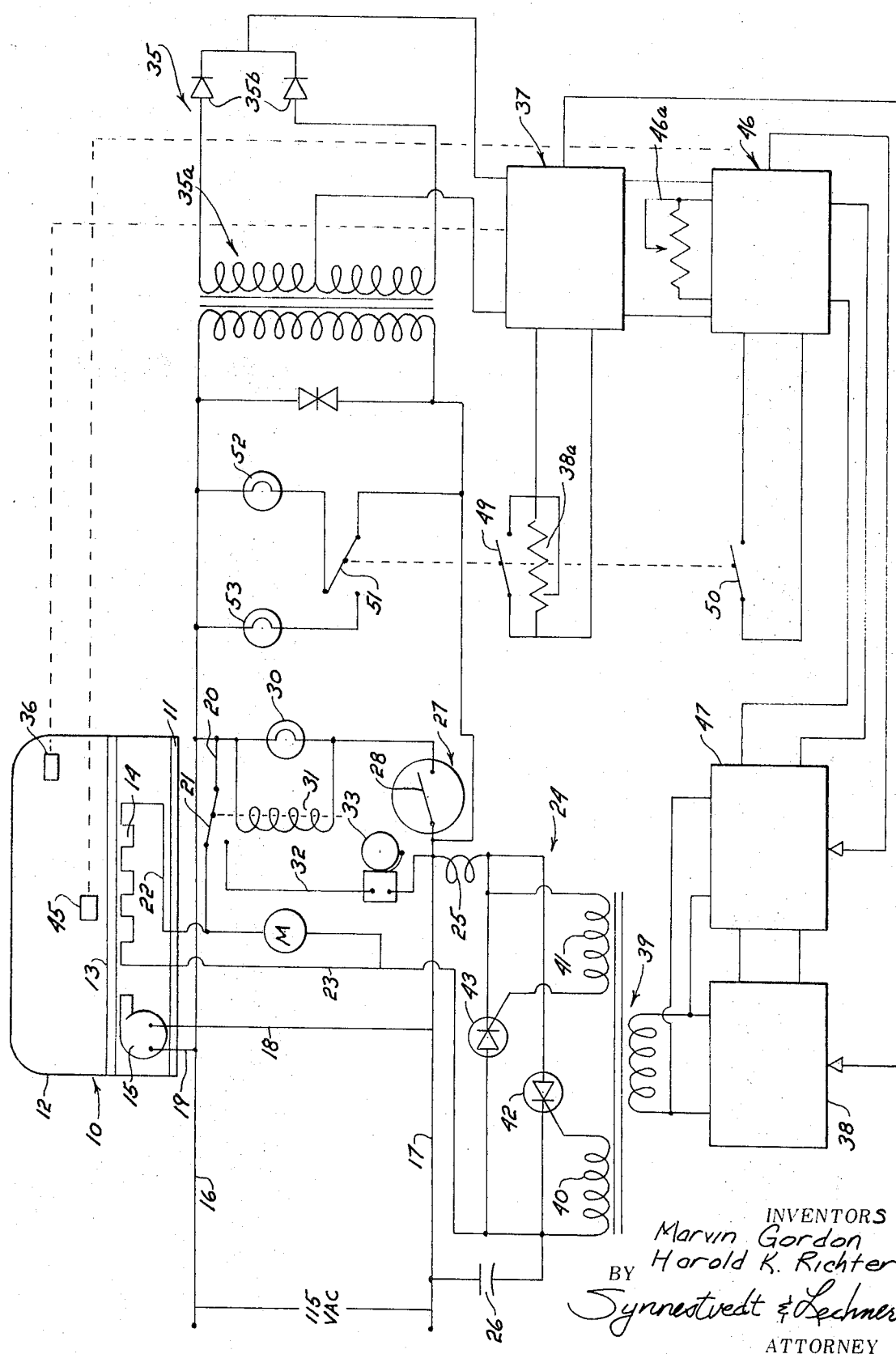

---

3,529,131
INCUBATOR TEMPERATURE CONTROL SYSTEM
Marvin Gordon, Southampton, and Harold K. Richter, Hatboro, Pa., assignors to Air-Shields, Inc., Hatboro, Pa., a corporation of Delaware
Continuation-in-part of application Ser. No. 673,613, Oct. 9, 1967. This application Sept. 30, 1968, Ser. No. 763,527
Int. Cl. H05b 1/02; A01g 23/10
U.S. Cl. 219—413  6 Claims

ABSTRACT OF THE DISCLOSURE

Incubator heater control system provides for limiting incubator air temperature and for proportioning heat delivered to the incubator as a function of heat requirements. Themistors are incorporated in an air temperature responsive circuit and an infant temperature responsive circuit, which in turn control a proportioning circuit which connects the incubator heater to the power supply.

---

This application is a continuation-in-part of application Ser. No. 673,613, filed Oct. 9, 1967.

This invention relates to incubators and is especially concerned with control systems providing for regulation and control of the temperature of the infant in the incubator.

For purposes of this invention, the term "incubator" should be construed to include any equipment for use in the care of patients, such as apparatus designed to control the environmental conditions of a patient, and in particular wherein the working area is restrictively controlled with respect to temperature. The conventional structure of incubators is such that a controlled temperature environment is established by way of heating means and restricted to a local area by way of a physical barrier which may take the form of an isolation shield.

A suitable interpretation of the term "incubator," and one applicable to the present invention, would include devices which maintain the controlled temperature environment by other means such as directing a stream of air in a laminar pattern so as to avoid the necessity of a physical enclosure. Thus, in the present invention, the incubator may be absent any restraining effect provided by way of a hood or shield. As an example of equipment which may serve as an incubator and wherein the patient and the support structure therefor are encompassed in a laminar flow air stream, reference is made to the copending application of Michael Sokol entitled Laminar Flow Special Procedures System bearing Ser. No. 766,590, filed in the U.S. Patent Office on Oct. 10, 1968, and assigned to the assignee of the present invention.

An important aspect of the invention arises from the fact that when a newborn infant is placed in an environment which is subject to a fluctuating air temperature, the infant, especially a very young one, does not readily make accommodation for temperature changes. It has been observed that such infants consume more oxygen than is the case when the temperature fluctuations do not exist. The foregoing is true whenever air temperature fluctuations exist, even though the infant's temperature is maintained at a substantially steady level. Moreover, the condition is apparently worsened when the air is being cooled than is the case when it is being warmed.

An important object of the invention therefor is the provision of means for closely regulating the amount of heat generated in an associated incubator thereby minimizing excessive oxygen consumption believed to be associated with fluctuations in temperature.

Another consideration of the present invention concerns the use as an incubator for premature babies. A defining characteristic of premature babies concern their relative inability to maintain a stable body temperature independent of the ambient temperature of their surroundings. Unlike more mature babies and adults, the premature baby is more likely to assume the temperature of its surroundings. This lack of a self-regulating temperature control mechanism in premature babies makes it important that the incubator be subject to accurate temperature control.

Accordingly, a related object of the invention is the provision of control circuitry which provides for accurate temperature control with a minimum of fluctuations during the time the temperature is brought to and held at the control temperature.

In carrying out the invention, control circuitry is provided including a device which is adapted to sense the air temperature within the incubator and to produce a signal which varies as a function of the temperature in the incubator. As the air temperature within the incubator reaches a preselected level, the control circuitry provides for gradually diminishing the amount of heat until the limit is reached at which just enough heat is delivered by the heater to maintain the temperature level.

Preferably, a second control circuit is provided which is adapted to sense the temperature of the occupant in the incubator and to produce an output signal varying in proportion to the temperature of the occupant. As the occupant approaches the selected temperature, the supply of heat delivered by the heater is gradually diminished until the preselected temperature is reached. The two circuits cooperate to improve control in two important respects. First, fluctuation of the temperature of the incubator is held at a minimum. Secondly, the possibility of overshoot, that is, the possibility of heating the atmosphere of the infant to a temperature above the preselected temperature, is substantially eliminated.

The foregoing features of the invention provide an additional advantage when the heater circuitry incorporates a limiting thermostat and conventional alarms for indicating when the temperature rises above a predetermined upper limit. Because of the elimination of the problem of overshoot, caused by cycling of the incubator air temperature, operation of the limiting thermostat is considerably minimized and usually will not occur unless there is an actual malfunction in the circuitry or a drastic change in ambient temperature as when the incubator is left next to a sunny window. Thus, the danger of false alarms is practically eliminated and operators and attendants will be more sensitive to the fact that a dangerous condition has occurred when the alarm is operated.

The various objects and advantages of the invention will be fully understood upon reference to the following detailed description of the preferred embodiment of the invention when taken in light of the accompanying drawing in which is shown, in diagrammatic form, an incubator and control system constructed according to the teachings of the invention.

The embodiment of the invention illustrated in the drawing and described herein below is of particular use as an infant incubator; however, most features of the invention may be useful in equipment adapted for use with children or adults.

In the drawing, an infant incubator is diagrammatically shown at 10 and consists of a base 11 and a hood 12 formed preferably of a transparent plastic material. The hood is typically hinged to provide for opening thereof, so that an infant can be placed inside on a mattress 13.

Located beneath the mattress is an electrical heating element 14 connected to an AC power source through heater control circuitry described more fully hereinafter. An air-circulating fan 15 is located next to the heater for the purpose of circulating air across the heater and thence into the hood enclosure 12.

The heater control circuit is connected to a 115-volt AC power source by means of a pair of leads 16 and 17. Branch leads 18 and 19 connect the fan to leads 16 and 17, so that the fan is operating so long as the leads 16 and 17 are connected to the power source.

Heater element 14 is connected to lead 16 via a lead 20, a normally closed switch 21 and a lead 22. A connection to the other side of the line is provided through lead 23 which is connected through proportioning circuit 24, described hereinafter. In brief, this circuit regulates the heater current in accordance with the heat requirements of the occupant. The proportioning circuit is connected to lead 17 via an inductance 25 and capacitance 26, the inductance and capacitance providing for RFI suppression in known manner.

A limiting thermostat 27, which incorporates a normally open switch 28, is connected to the lead 17. Thermostat 27 is set to respond and close switch 28 whenever a predetermined upper limit of air temperature is reached. In most cases, a limiting thermostat will be selected which will respond at an incubator air temperature of about 100° F.

When switch 28 is closed, a circuit connection is provided from the lead 17 to a circuit for lighting an overheat warning lamp 30 and for operating a relay 31. When relay 31 is energized, following closure of the thermostatic switch, the switch 21 breaks the connection from lead 20 to lead 22, thus de-energizing the heater. Switch 21 is a two-way switch and when the relay 21 is energized, it pulls the switch to a position in which a circuit 32, having a warning buzzer 33, is connected across the power supply.

From the foregoing, it can be seen that should the limiting thermostat be heated to the temperature at which the switch 28 closes, the heater is disconnected, the lamp 30 gives a visual indication that this has occurred and buzzer 33 sounds a warning.

The present invention is primarily concerned with control circuitry for controlling the air temperature at levels below the upper limit established by the upper limiting thermostat and as noted above, it is an important feature of the invention that fluctuations of air temperature be minimized.

In carrying out this object of the invention, a first thermistor element 36 is incorporated in an air temperature control circuit, schematically shown at 37. The thermistor 36 is located within the incubator in position to sense the temperature of the air. As will be understood by those skilled in the art, the resistance of the thermistor 36 will vary as a function of its temperature and it is this characteristic which is used to vary the heat delivered in accordance with the heat requirements of the patient.

Air temperature control circuit 37 is connected to the power supply via a conventional full-wave rectifier 35 including transformer 35a and diodes 35b. The circuit may comprise a conventional bridge circuit in which the thermistor is connected in one arm of the bridge. A potentiometer 38a provides for adjustment of the bridge in such manner that a predetermined limit of air temperature, below the limit established by the limiting thermostat, can be selected for control purposes.

The output of the air temperature control circuit 37 is connected to a gate circuit 38 which delivers gating or trigger pulses to the primary winding of pulse transformer 39.

Pulse transformer 39 is provided with secondary windings 40 and 41 which control the firing of silicon controlled rectifiers 42 and 43, respectively. As will be understood by those skilled in the art, control pulses from the secondary of the pulse transformer, produced in response to the gating pulses, cause rectifier 42 to begin conducting during one phase of each AC cycle and rectifier 43 to begin conducting during the opposite phase. By regulating the timing of the pulse with respect to the start of the phase, the fraction of the phase during which the silicon controlled rectifier conducts, commonly termed the phase angle, can be varied. By varying this angle as a function of resistive changes in thermistor 36, the heat output of heater 14 is proportionally controlled in accordance with the heat requirements of the system.

A second thermistor unit 45 is located within the incubator and is adapted to be attached to the body of the occupant. Thermistor 45 forms a part of an infant temperature control circuit 46 and is responsive to the occupant temperature to regulate the circuit resistance to thereby control the firing of gate 47. Gate 47 is identical in construction and operation to gate 38 and is also connected to the primary of pulse transformer 39. A rheostat 46a provides for selection of the desired occupant temperature.

We prefer that occupant temperature control circuit 46 be only operative to exert control over the heater when the air temperature control circuit potentiometer is set at its upper limit. For this purpose, a pair of switches 49 and 50 are ganged so as to be closed by the potenitometer 38a when the potentiometer is set at its maximum air temperature (98° F.) and to be opened at all temperatures below that temperature. The closing of switch 49 effectively shunts the air temperature potentiometer out of the air temperature control circuit 37. As a result of the air temperature control circuitry becomes non-responsive to temperatures below the maximum air temperature (98° F.). At the same time the air temperature control circuitry remains responsive to temperatures in excess of 98° F.

Thus, if for some reason, the occupant temperature circuitry becomes erratic and continues to call for heat such that the ambient temperature rises above 98° F., the air temperature control circuitry will sense this condition and exercise proportional control of the silicon controlled rectifiers in the manner herein described so as to maintain the maximum air temperature at its predetermined limit.

Whenever switch 50 is closed, the infant temperature control circuit is operative.

Also ganged for operation by the rheostat 38a is a switch 51. In the upper position of the switch, as viewed in the drawing, lamp 52 is connected in the circuit indicating that the air temperature control is in operation. In the lower position of the switch 51, which corresponds to the closed position of switch 50, lamp 53 is lighted.

Assuming, for purposes of illustration, that the control system is set to operate using the occupant control circuit, and further assuming that an infant having a body temperature of 92° F. is placed in an incubator when the incubator air temperature is 91° F., the control circuit will call for heat and each of rectifiers 42 and 43 will conduct for substantially the full phase of each cycle. As the air temperature approaches the preset level, the firing time of gate 47 will begin to be retarded and each rectifier will conduct for a proportionally small fraction of a phase. The temperature in the incubator will stabilize until such time as the infant responsive thermistor senses that the infant has reached the desired temperature. At this point, proportionately less heat will be delivered to the system as the firing of the gate 47 will be further retarded as the resistance in thermistor 45 further decreases. The air temperature will cool somewhat until a point is reached at which just enough heat is delivered to maintain the infant temperature at the required level.

We have found that the infant's temperature can thereafter be maintained within a very narrow band of temperatures, which is generally no wider than about .2 of a degree Fahrenheit, even though wide fluctuations in ambient temperatures exist. In actual tests, the maximum variation was found to be .3 of a degree Fahrenheit with ambient temperature variations of 73° F. to 106° F.

Operation is substantially identical when the system is on air temperature control, except that control is maintained at a preselected temperature set by the operator.

In the case of air temperature control or occupant temperature control, when a temperature limit is refered to, it should be understood that in actual practice a relatively narrow band of temperatures centering around the set temperature will result. As noted above, in the case of the infant or occupant responsive circuit, this band will generally be no greater than about .2° F. with a maximum of .3° F. In the case of the air temperature control circuit, the minimum width of the band may be 1° F., however, in actual practice, even this band will be much smaller. For practical purposes and for purposes of claim definition, the terms "temperature limit" and "preselected temperature" should be understood to encompass such minor fluctuations around the control temperatures.

In order to give the attendants and physicians an indication of the heat requirements of the occupant, a volt meter M is connected across the heater leads 22 and 23. Periodic inspection of the volt meter M will give the operator a good indication of the heat required by the occupant.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

We claim:

1. A system for controlling the heating of the air in an incubator having an AC heater mounted within said incubator, said system comprising an air temperature control circuit including a presettable control device adapted to establish a preselected limit of air temperature in the incubator, a thermistor in said circuit, said thermistor being mounted within said incubator and providing a varying resistance in said circuit in response to changes in the incubator air temperature, a gating circuit controlled by said temperature control circuit, said gating circuit producing periodic output pulses and being responsive to changes in thermistor resistance to displace said pulses with respect to time as a function of the thermistor resistance, and a heater power supply circuit and control means in said circuit providing for connection of the heater to an AC supply, said control means being operative to vary the fraction of each cycle of AC current delivered to the heater in proportion to the displacement of said gating pulses.

2. A control system according to claim 1, further including an occupant temperature responsive circuit including a thermistor adapted to sense the temperature of the occupant, said circuit producing a resistance varying as a function of the occupant's temperature, and a second gating circuit controlled by said occupant temperature sensing circuit and connected to said heater circuit control means, said gating circuit producing periodic output pulses and being responsive to changes in the thermistor resistance to displace said pulses with respect to time by amounts proportional to the changes in resistance in said occupant temperature control circuit, said heater circuit control means being operated by the pulses from said second gating circuit.

3. A system for controlling the heating of the occupant of an incubator including a heater and a circuit means for connecting the heater to an AC power supply, comprising a pair of silicon controlled rectifiers connected across the power supply to alternately conduct during the alternate phases of each cycle, and control means connected to said rectifiers, and producing trigger pulses timed with respect to the start of each phase of the AC cycle, said pulses being operative to cause the rectifiers to begin conducting during the phases of each cycle, means comprising a first thermistor responsive to the air temperature in said incubator and a second thermistor responsive to the temperature of the occupant in said incubator, and first and second circuit means connecting said thermistors with said control means and providing for the delay of said trigger pulses as a function of the heat requirement of the occupant.

4. A control system according to claim 3 wherein said first thermistor responsive circuit includes a presettable control device connected to enable the output of said heater to be varied over a range of values, said second thermistor responsive circuit being connected to be operative only when said presettable control device has been set at a predetermined position so as to generate a predetermined air temperature output from said heater, said circuit means for connecting the heater to said AC power supply being solely responsive to said air temperature responsive circuit when said first presettable control device is set to other than said predetermined position and to both said air temperature and occupant temperature responsive circuit when said presettable control device is set to said predetermined position.

5. A control system according to claim 4 wherein said predetermined position of said presettable control device establishes an air tempperature of 98° F., within said incubator.

6. A temperature control system for an incubator comprising heating means and a suitable source for energizing said heating means, proportional control means operatively interconnecting said heating means and said energizing source, said proportional control means including a first gating circuit for controlling the amount of energy delivered by said energizing source to said heating means to control the air temperature within said incubator and a second gating circuit for controlling the amount of energy delivered by said energizing source to said heating means in response to the temperature of the occupant in said incubator, a plurality of independently operative sensing means including a first sensing means connected to said first gating circuit and responsive to the air temperature in said incubator and second sensing means connected to said second gating circuit responsive to the temperature of the occupant in said incubator, said first gating circuit further including a presettable control device operatively connected to vary the air temperature within said incubator over a range of temperatures, and switching means for selectively interconnecting said first and second control circuits to said proportional control means such that said proportional control means is responsive to said first gating circuit including said sensing means only when said presettable device is set at a predetermined position and responsive to both said first and said second gating circuits and associated sensing means when said presettable device is set at other than said predetermined position.

References Cited
UNITED STATES PATENTS

| | | | |
|---|---|---|---|
| 3,338,233 | 8/1967 | Grosholz et al. | 219—516 X |
| 2,975,261 | 3/1961 | Keen et al. | 219—413 X |
| 3,299,253 | 1/1967 | Lawson | 219—385 |

H. B. GILSON, Primary Examiner

U.S. Cl. X.R.

219—513; 236—3